United States Patent [19]
Acks

[11] Patent Number: 5,386,355
[45] Date of Patent: * Jan. 31, 1995

[54] METHOD AND APPARATUS FOR ILLUMINATING A HAZARDOUS UNDERWATER ENVIRONMENT

[75] Inventor: Robert S. Acks, San Diego, Calif.

[73] Assignee: Remote Ocean Systems, Inc., San Diego, Calif.

[*] Notice: The portion of the term of this patent subsequent to Apr. 14, 2009 has been disclaimed.

[21] Appl. No.: 42,450

[22] Filed: Apr. 1, 1993

Related U.S. Application Data

[63] Continuation-in-part of Ser. No. 825,564, Jan. 24, 1992, Pat. No. 5,213,410, which is a continuation-in-part of Ser. No. 579,655, Sep. 10, 1990, Pat. No. 5,105,346.

[51] Int. Cl.6 .................... F21V 29/00; F21V 31/02
[52] U.S. Cl. .................... 362/267; 362/218; 362/226; 362/378
[58] Field of Search .............. 362/218, 222, 226, 263, 362/264, 267, 369, 378

[56] References Cited

U.S. PATENT DOCUMENTS

| | | | |
|---|---|---|---|
| 3,949,212 | 4/1976 | Larrimore | 362/267 |
| 4,683,523 | 4/1987 | Olsson et al. | 362/267 |
| 5,105,346 | 4/1992 | Acks et al. | 362/267 |
| 5,213,410 | 5/1993 | Acks | 362/269 |

Primary Examiner—Ira S. Lazarus
Assistant Examiner—L. Heyman
Attorney, Agent, or Firm—Brown, Martin, Haller & McClain

[57] ABSTRACT

The underwater portable drop light for use illuminating work sites in nuclear facilities has a high pressure sodium arc lamp sealed to a stainless steel base with a flexible, radiation-resistant seal to provide a watertight and shock-absorbing connection. A wet-mateable connector is attached to the base to permit underwater-changeable connection to a cable which supplies power from a ballast power supply. A light-transmissive, impact-resistant cover is formed around the arc lamp and attached to the base. The cover has openings through which water can flow in and out to conduct heat away from the arc lamp. The combination of the above elements creates a compact modular unit which is replaced as a whole when the arc lamp burns out, and which may be replaced in or out of the water, allowing maintenance work to continue essentially uninterrupted when radiation exposure time is an issue.

14 Claims, 1 Drawing Sheet

METHOD AND APPARATUS FOR ILLUMINATING A HAZARDOUS UNDERWATER ENVIRONMENT

This is a continuation-in-part of Ser. No. 07/825,564 filed Jan. 24, 1992 now U.S. Pat. No. 5,213,410 which is a continuation-in-part of Ser. No. 07/579,655 filed Sep. 10, 1990, now issued as U.S. Pat. No. 5,105,346.

FIELD OF THE INVENTION

The present invention relates to illumination systems and more particularly to illumination systems for hazardous underwater environments in which the hazard is nuclear radiation.

BACKGROUND OF THE INVENTION

A large number of reasons exist for lighting a large underwater environment including security, safety and illumination of work surfaces. Applications include oil drilling platforms, lighting around submarines and ships and for storage pools. In all applications it is desirable to use a high efficiency, long lifetime light source which can provide continuous lighting with minimal maintenance. Nowhere is the need for a low maintenance lighting system more pronounced than in nuclear spent fuel storage pools and in nuclear reactor vessels, in which water is used to slow the reaction rate, where service of the lighting system results in radiation exposure for maintenance personnel.

Typically, these pools require a large number of lights for effective illumination. Traditionally this lighting has been accomplished using 1000 W, 120 V incandescent spotlights or floodlights. These bulbs have lifetime ratings of 2,000 to 4,000 hours, and provide total light output of 17,000 lumens. At a lifetime of 4,000 hours, a particular light fixture will require 2.19 bulb changes per year, with maintenance personnel being exposed to radiation at each bulb change. A typical fuel storage pool uses 20 incandescent light fixtures. Thus, maintenance personnel are subjected to short periods of radiation quite frequently for single bulb changes or to extended periods of exposure for "en mass" changes, if the bulbs are replaced at all.

In the reactor cavity of a nuclear reactor, water is normally contained only in the immediate area of the reactor itself, i.e., the reactor vessel. However, when the reactor is shut down to change the fuel, it is necessary to fill the entire reactor cavity to control the reaction rate of the replacement fuel as it is loaded. The reactor cavity is flooded only about four to five days out of a year, but it is necessary to make sure that lighting in the cavity is capable of safe and reliable operation in underwater or high humidity environments when such operation becomes necessary.

When maintenance is being performed on the reactor itself, and when the fuel is being changed, maintenance personnel do not have a lot of time to concern themselves with routine maintenance operations such as changing burned out light bulbs. In isolated areas where radiation can become quite high, access is available only for limited periods, and it takes several days to bleed off the radiation. When access is finally available, workers are concerned with maintenance of pumps and other equipment, and with the fuel change. Every minute of radiation exposure is critical, and excess radiation exposure can result in fines for the reactor operator and loss of manpower if a worker's cumulative radiation exposure exceeds a predetermined level. As a result, many light bulbs remain burned out, so that much of the structure is poorly illuminated. Even in areas where water is not introduced, a reliable, long lasting light source is replacements for the currently-used old-style incandescent bulbs.

A number of underwater lights are the subjects of patents, however, for various reasons, these lights are not suitable for use in nuclear environments, either as fixed lights or as drop lights. The submersible light assemblies of Olsson et al. (U.S. Pat. No. 4,683,523, issued Jul. 28, 1987 and U.S. Pat. No. 4,996,635 issued Feb. 26, 1991) have funnel-shaped housings with flared front portions designed for fixed attachment to submersible vehicles. The light sources are quartz-halogen lamps which require heat sinks, and the lamps themselves are fully isolated from water. The housings are relatively large and cumbersome and not adjustable in direction once attached. The light produced is generally projected in a narrow beam forward from the lens. Such a construction would not be suitable for the broad illumination needed in a nuclear pool or for the maneuverability required for a drop light.

The underwater light of Poppenheimer (U.S. Pat. No. 4,574,337, issued Mar. 4, 1986) has a housing that is much larger than the small quartz-halogen lamp housed therein. The lamp is fully isolated from the water by an inner casing which is cooled by water that enters the outer housing. The light is projected forward in a generally narrow beam, resulting in the same limitations for use in nuclear applications as the lights of Olsson et al.

The high-intensity light source described by Mula (U.S. Pat. No. 5,016,151, issued May 14, 1991) has a watertight housing with a second subhousing to isolate the lamp from the water. The flared shape of the housing places limitations on the maneuverability of such a device as a drop light.

Finally, and most importantly, none of the above-described lights make provisions for rapid changeout of burned out or damaged bulbs. The reliance on closed housing construction requires any bulb changes to be made out of the water, which is one of the main problems that must be overcome in a hazardous environment such as in nuclear facility pools. Such changes are time-consuming and require multiple radiation exposures to effect a bulb replacement. If the entire lighting assembly were to be replaced to avoid multiple exposures, such changes would be very expensive due to the complex construction of the assemblies. Any facility which required a large number of such light systems would find them to be prohibitively expensive.

High pressure sodium (HPS) lighting has been used extensively for street and parking area illumination, lighting in factories and for security lighting. The primary advantages of HPS lights are 1) high efficiency and 2) very long lifetime. Compared to a 1000 W incandescent bulb, an HPS bulb has a lifetime rating of 24,000 hours and provides a total light output of 140,000 lumens. Simple math emphasizes the advantages of HPS lights: one HPS bulb provides the light of eight incandescent bulbs for six to twelve times longer.

SUMMARY OF THE INVENTION

It is an advantage of the present invention to provide an apparatus and method for illuminating underwater environments using high pressure sodium (HPS) lights. In an exemplary embodiment, the underwater illumination apparatus has a high pressure sodium arc lamp sealed to a stainless steel base with a flexible, radiation-resistant potting material to provide both a watertight seal and a shock-absorbing connection. Alternatively, one or more O-rings may also be used to provide watertight connection of the arc lamp to the base. A wet-mateable base connector is attached to the base to permit connection to a lower cable. A light-transmissive, impact-resistant cover is formed around the base and the tube. The cover is either a mesh or is a solid surface with holes through which water can flow in and out to conduct heat away from the arc tube. The combination of the above elements creates a modular unit which is replaced as a whole when the arc lamp burns out.

The lower cable which provides power to the arc lamp has a connector which mates with the base connector. The lower cable is attached at its other end to a ballast power supply which is hermetically sealed in a stainless steel housing. Wet-mateable connectors are provided at the inlet and outlet of the ballast power supply to attach to the lower cable and to the upper cable for connection to a 120 VAC source.

A highly-polished reflector partially surrounds the modular unit to provide directional lighting capability. In one embodiment, the components are mounted on a pole by which the apparatus may be suspended into the water.

A drop light is created by sealing a relatively small diameter arc lamp with a quartz envelope to a base and encasing it in an impact resistant cover of LEXAN or a stainless steel screen, creating a narrow cylindrical modular unit. A wet-mateable connector at the end of the base attaches to a cable connected to a ballast power supply. An optional parabolic or spherical reflector may be attached to the base to encircle the bulb to direct light in a direction initially parallel to the centerline of the lamp. This drop light is ideal for use in nuclear reactor pools, fuel and spent fuel storage pools and other underwater or high humidity areas inside a nuclear reactor, since the underwater connector allows a rapid change of a burned out or damaged light unit without leaving the work site. The small diameter of the lamp, which is made possible by the quartz envelope, makes the drop light useful in tight working areas and for inspection of corners, crevices and partially obstructed locations within a nuclear reactor.

In applications where a light source is needed that can be safely used in both water and in air without modification, a stainless steel screen is used to cover the arc lamp. Other corrosion-resistant, chemically-stable metals may also be used for a screen. The metal screen permits cooling of the arc lamp while underwater but will not melt when used in air, as a plastic-like material might. An arc lamp with a quartz envelope can tolerate a transition from air to water without requiring the lamp to be shut off and cooled before immersing the lamp in the water.

BRIEF DESCRIPTION OF THE DRAWINGS

The present invention will be better understood from the following detailed description of a preferred embodiment, taken in conjunction with the accompanying drawings, in which like reference numerals refer to like parts, and in which.

DETAILED DESCRIPTION OF THE PREFERRED EMBODIMENT

Figure 1:
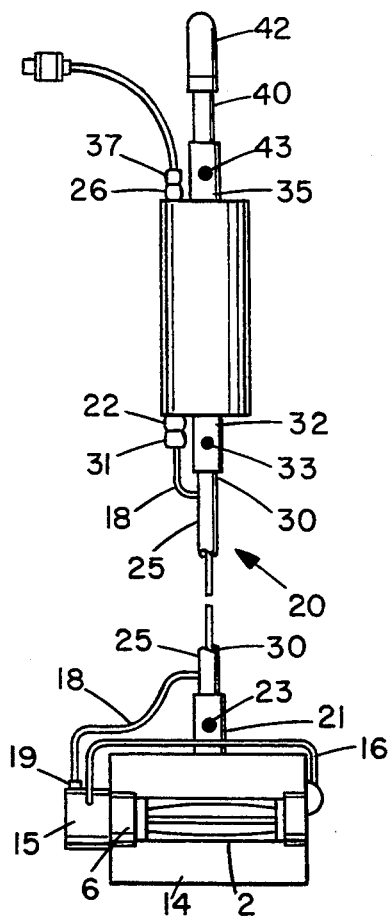
FIG. 1 is a diagrammatic front elevation of a first embodiment of the modular lighting apparatus.
Figure 2:
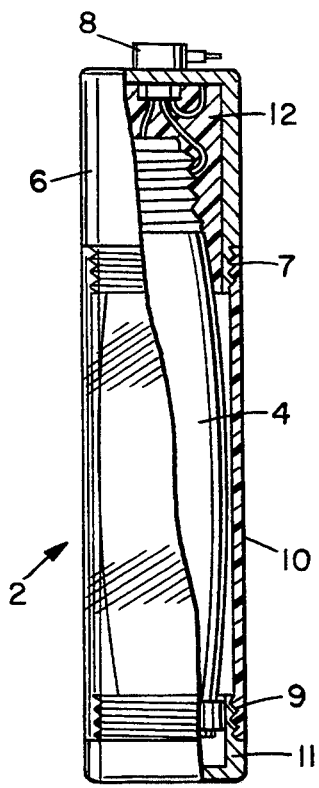
FIG. 2 is a side elevation partially cut away of the modular lighting unit.

As shown in FIGS. 1 and 2, in the first embodiment, modular lighting unit 2 comprises arc lamp 4, base 6, connector 8 and transparent cover 10. Potting material 12 seals the connection between arc lamp 4 and base 6. An O-ring may also be inserted between the base 6 and arc lamp 4 in place of the potting material 12 to provide a watertight seal and shock-absorption. A reflector 14 partially surrounds modular lighting unit 2 and is supported by yoke 16 to permit pivoting of reflector 14. Lower cable 18 mates with connector 8 and runs up pole 20 to mate with lower connector 22 of ballast power supply 24. Ballast power supply 24 is mounted on pole 20. Upper connector 26 mates with upper cable 28 which provides connection to a 120 VAC source.

The components of modular lighting unit 2 are permanently assembled to provide a watertight seal between the arc lamp 4 and base 6. Base 6 is preferably made of stainless steel with soldered or welded wire connections. On the outer end of base 6 connector 8 is attached. Connector 8 is a low profile wet-mateable connector so the modular unit 2 may be changed underwater without drying the connectors. The base 6 is filled with potting material 12 to cover the end of arc lamp 4 providing a permanent waterproof bond. Potting material 12 is flexible, radiation tolerant and retains its effectiveness at high temperatures. A suggested material is silicone sealant.

Figure 4:
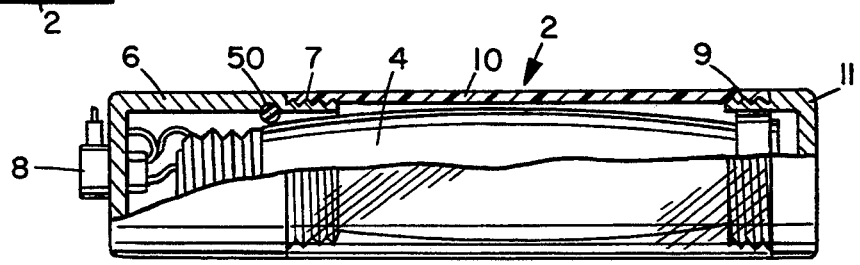
FIG. 4 is a side elevation, partially cut away, of the drop light unit with an O-ring seal.

An O-ring may be used as an alternative to potting material 12, as illustrated in FIG. 4, however it must also possess radiation- and high temperature-tolerance. Since the base 6 will not be filled in this embodiment, extra care must be taken to assure that its exterior is well sealed against water intrusion.

Arc lamp 4 is preferably a high pressure sodium arc lamp chosen for its long lifetime and highly-efficient light output. Such a bulb is rated at 24,000 hours lifetime with an output of 140,000 lumens for a 1000 watt bulb. For situations where lower light output is desired, a lower wattage rating high pressure sodium or a low pressure sodium bulb may be used. Other types of arc lamps are available at different wattage ratings and may be used, including mercury vapor and thallium-iodide-doped mercury vapor to provide high-efficiency, long lifetime lighting. Use of mercury vapor lamps in nuclear pools is generally undesirable due to the potential for attack of stainless steel by mercury if a bulb should break. However, mercury vapor lights, especially thallium-iodide doped lights, have the advantage of lower absorption of the emitted wavelength of light in water than sodium lights, so mercury vapor may be desirable for use in non-nuclear, clear water applications.

Figure 6:
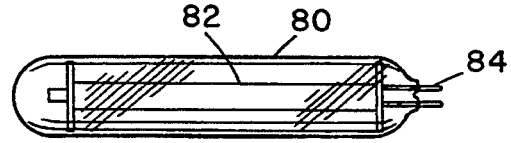
FIG. 6 is a side elevation of an arc lamp encased in a quartz envelope.

As illustrated in FIG. 6, the transparent envelope 80 which surrounds the element 82 may formed from quartz or fused silica (optically transparent) tubing with a diameter as small as 30 mm O.D.×26 mm I.D.. The tubing is sealed and rounded at one end and is necked down to seal the conductive prongs 84 at the opposite end. An opening is made in the side, the tube is evacuated, then sealed using techniques that are known in the art. The resulting quartz-encased high pressure sodium lamp can tolerate compressive forces of 2000 psi or more, compared with a typical Pyrex TM glass envelope which can tolerate 80–90 psi. This greatly increased pressure tolerance is due not only to the inherent strength of the quartz, but also to the ability to incorporate smaller diameter tubing.

Transparent cover 10 is constructed of an impact-resistant polycarbonate such as LEXAN or other similar impact-resistant material. Cover 10 has internal threads 11 at both ends to mate with external threads 7 of base 6 and external threads 9 of end plug 11. End plug 11 is preferably made of stainless steel. The arc lamp 4 is supported within the cover 10 so that it does not touch the inner surfaces of cover 10 or end plug 11. The arc lamp 4 is suspended so that shock is not transferred if the cover 10 is struck and to avoid melting the cover 10 if is should come in contact with the arc lamp 4. To provide cooling of arc lamp 4, several holes are made in cover 10 to permit water to enter and exit modular unit 2.

Figure 3:
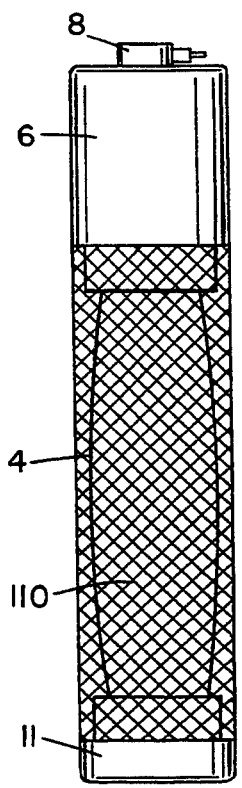
FIG. 3 is a diagrammatic side view of an alternate protective cover configuration.

As an alternative to the polycarbonate cover, a stainless steel screen 110, shown in FIG. 3, is used to permit use of the same unit in air and water. While underwater, the arc lamp 4 is sufficiently cooled that it does not heat the cover. However, if use of the same unit in air is desired, there is a risk that the heat generated by the lamp will melt polycarbonate. A stainless steel screen 110 will tolerate the higher temperatures in air while allowing water to flow through it underwater without significantly impairing illumination. The screen 110 is sufficiently rigid to provide impact-resistance similar to that of the polycarbonate. An arc lamp 4 with a Pyrex TM or other glass envelope that has been in use will need to be cooled somewhat before moving from air to water, however, an arc lamp with a quartz envelope can tolerate the transition without shattering.

Reflector 14 is generally parabolic in shape with modular unit 2 centered at its focus. The inner surface is highly polished to provide a high-efficiency reflection. Reflector 14 is held in place by yoke 16 which is rotatably attached at opposite ends of the reflector to permit pivoting of the reflector in a vertical direction. Reflector 14 has a cylindrical extension 15 which is open and has an inner diameter slightly larger than the outer diameter of modular unit 2. An opening 17 in an upper portion of cylindrical extension 15 permits insertion of connector 19 of lower cable 18 to mate with connector 8.

For changing modular unit 2, connector 19 is disconnected so that modular unit 2 can be slid out through cylindrical extension 15. A new modular unit 2 is inserted into cylindrical extension 15 so that attachment of mating connectors 8 and 19 lock the modular unit 2 in place.

Extending upward from yoke 16 is socket 21 into which pole 20 inserts and locks using quick-release pin 23. If replacement of the reflector 14 and modular unit 2 is required, connectors 8 and 19 are detached and pin 23 is released to remove the entire light head as a unit.

Pole 20 is a hollow pipe which has openings 25 in its side to permit entry and exit of cable into and out of pole 20. The lower pole section 30 inserts into socket 32, held in place by quick-release pin 33. Lower cable 18 runs up lower pole section 30 exiting through opening 25 so that connector 31 can mate with lower connector 22 of ballast power supply 24. A pivot or ratchet assembly may be included at the bottom of pole 20 to permit adjustment of the direction of illumination beyond that provided by reflector 14 alone.

Ballast power supply 24 converts the 120 VAC input signal into a constant current supply for driving arc lamp 4. For underwater mounting and operation, ballast power supply 24 is hermetically sealed in a stainless steel housing to permit reliable watertight operation. Lower connector 22 and upper connector 26 are wet mateable with connectors 31 and 37 respectively. The upper portion of ballast power supply 24 has a socket 35 into which upper pole section 40 inserts and is held in place by quick-release pin 43. The use of wet mateable connectors and quick-release pins at both input and output permit ballast power supply 24 to be replaced as a unit as needed. In an alternate embodiment, where ballast power supply 24 is in air, mounted on a pole or structure sufficiently remote from the water, a weatherproof steel enclosure may be used.

Upper pole section 40 has a lift bail 42 made preferably of stainless steel to facilitate handling and hanging of the assembly from the side of a floating platform or the side of a tank.

Upper cable 28 provides electrical connection between ballast power supply 24 and a 120 VAC source.

Lower cable 18 and upper cable 28 are preferably polyurethane covered for radiation tolerance, durability and easy decontamination. The modular design of the cables facilitates replacement if they are damaged.

Figure 5:
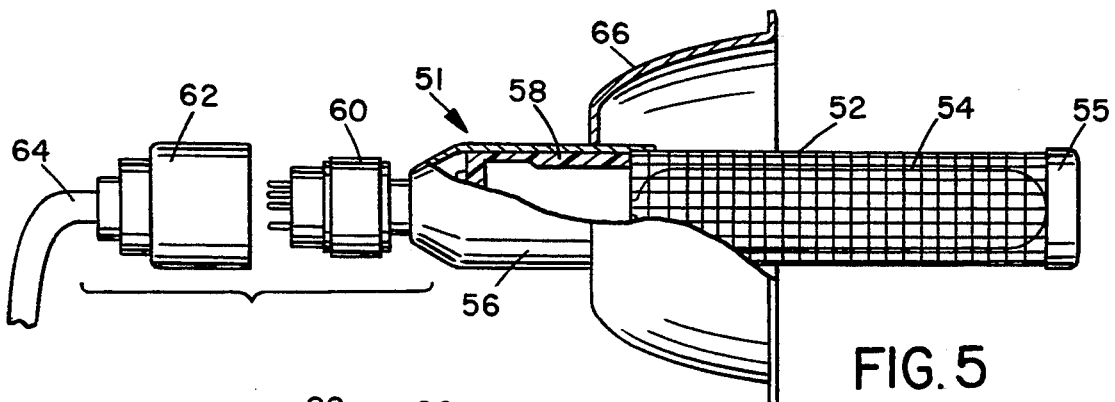
FIG. 5 is a side elevation, partially cut away, of the modular drop light incorporating a quartz envelope for the arc lamp.

In a second embodiment illustrated in FIG. 5, a modular unit 51 is constructed in a similar manner to modular unit 2 of the first embodiment for use as a drop light which may be hand-held, dangled from a cable, or placed on a surface near the work site. A tubular stainless steel screen 52 encases the bulb 54 for impact protection, and a stainless steel cap 55 at the end of screen 52 protects the end of the bulb 54. If the bulb should be accidentally shattered, the glass fragments will be contained within the screen. The conductive prongs at the end of bulb 54 are plugged into a connector inside base 56 and a watertight seal is formed by either filling the base with potting compound 58, as shown, or by surrounding the bulb with a well-fit O-ring (as in the embodiment of FIG. 4) to provide the desired seal. A wet-mateable connector 60 extends from base 56 for connection to a matching connector 62 at the end of cable 64, which carries power from a ballast power supply. An optional reflector 66 may be slid over the base 56 to direct light from the arc lamp. Reflector 66 may be held in place by a bayonet mount, spring tabs, or other similar locking mechanism. The reflector 66 may be parabolic or spherical and should be polished on its inner surface to provide optimal reflection.

If the bulb in the modular unit 51 is damaged or burns out, the entire unit 51 is replaced by disconnecting connectors 60 and 62 and reconnecting a new unit. This quick-changeover capability is essential when the drop light is being used in a nuclear facility where exposure to radiation hazards limits the amount of time that can be spent on a repair or other maintenance operation. The underwater lighting systems of the prior art isolate the lamp, usually quartz-halogen, from the water. If a lamp burns out, the user must leave the water, disassemble the housing, replace the bulb, making sure that it and its connections remain dry, reassemble the housing, and re-enter the water to continue working. In a nuclear facility, this may mean that the individual must go through decontamination procedures just to change the lamp. In any event, the worker is exposed to radiation several times to finish a single task. In the present invention, the small size of the drop light enables spare units to be carried without being overly cumbersome, so the change can be made at the work location without wasting valuable time.

The use of a quartz envelope for the drop light permits a significant reduction in the light's dimensions, making it useful for smaller areas where access is limited and working room is minimal. The small diameter drop light can be inserted into crevices and corners, and behind equipment, to allow inspection in locations which could not previously be illuminated due to the larger sizes of conventional drop lights. Further, since conventional drop lights use incandescent lamps, the amount of illumination provided by these lamps may be insufficient to fully illuminate an obstructed work area. The high pressure sodium arc lamp provides significantly greater illumination.

The above-described apparatus and method for illuminating an underwater environment are intended for direct replacement of existing incandescent lighting in nuclear pools, both fixed lights and portable drop lights, but clearly are suitable for other underwater or combination air and underwater applications. The design provides greatly-improved reliability with a minimal amount of maintenance using already-available power sources. Because of the higher efficiency and service lifetime, the operating and maintenance costs are substantially lower than for incandescent lighting. Most importantly, the exposure of maintenance personnel to radiation and other hazards in the underwater environment is drastically reduced.

It will be evident that there are additional embodiments which are not illustrated above but which are clearly within the scope and spirit of the present invention. The above description and drawings are therefore intended to be exemplary only and the scope of the invention is to be limited solely by the appended claims.

I claim:

1. A modular drop light for an apparatus for illuminating a work site in an underwater location within a nuclear environment, wherein said modular drop light is replaceable without leaving the work site, the modular drop light comprising:
   an arc lamp for emitting light;
   a base for mating with and for conducting electricity to said arc lamp;
   a seal for creating a watertight connection between said arc lamp and said base;
   a light-transmissive impact-resistant cover for enclosing said arc lamp and attaching to a first end of said base; and
   a releasable wet-mateable connector attached to a second end of said base;
wherein said drop light is replaced by disconnecting said releasable wet-mateable connector of an old said modular drop light from a corresponding connector on power cable and connecting the corresponding connector to a new said modular drop light.

2. A modular drop light as in claim 1 further comprising a polished reflector disposed to partially surround said arc lamp to control the direction of reflection of light from said arc lamp.

3. A modular drop light as in claim 1 wherein a plurality of vent holes are provided in said light-transmissive cover to permit water to flow around said arc lamp.

4. A modular drop light as in claim 1 wherein said arc lamp comprises a high pressure sodium arc lamp.

5. A modular drop light as in claim 1 wherein said seal comprises a potting material.

6. A modular drop light as in claim 1 wherein said seal comprises an O-ring.

7. A modular drop light as in claim 1 wherein said light-transmissive cover is a stainless steel screen.

8. A modular drop light as in claim 4 wherein said arc lamp has a quartz envelope.

9. A method for illuminating a work site in an underwater environment in a nuclear facility using a portable drop light which permits rapid underwater replacement of burned-out or damaged light sources to lessen exposure of maintenance personnel to radiation hazards of said underwater environment, said method which comprises:
   forming at least one replaceable drop light unit by the steps of:
      selecting an arc lamp as a light source;
      selecting a base for mating with and for conducting electricity to said arc lamp;
      selecting a releasable wet-mateable connector for attachment to said base;
      sealing said arc lamp to said base with a heat- and radiation-tolerant seal to provide a watertight seal; and
      enclosing said arc lamp within and affixing to said base a light-transmissive impact-resistant cover;
   attaching a radiation-tolerant cable means to said releasable wet-mateable connector; and
   selecting a ballast power supply for connection to said cable means for providing electrical power to said arc lamp whereby said replaceable drop light unit is replaced by disconnecting said releasable wet-mateable connector of a burned-out drop light unit from said cable means and connecting said releasable wet-mateable connector of a new replaceable drop light unit to said cable means.

10. A method as in claim 9 further comprising partially surrounding said at least one replaceable drop light unit with a polished reflector.

11. A method as in claim 9 wherein the step of enclosing said arc lamp in a light-transmissive impact-resistant cover includes providing a plurality of vent holes in said cover to permit water to flow around said arc lamp.

12. A method as in claim 9 wherein the step of enclosing said arc lamp in a light-transmissive impact-resistant cover includes selecting a stainless steel screen.

13. A method as in claim 9 wherein the step of selecting an arc lamp includes selecting a high pressure sodium arc lamp.

14. A method as in claim 13 wherein the step of selecting a high pressure sodium lamp includes selecting a lamp with a quartz envelope.

* * * * *

UNITED STATES PATENT AND TRADEMARK OFFICE
CERTIFICATE OF CORRECTION

| | | |
|---|---|---|
| PATENT NO. | : 5,386,355 | Page 1 of 1 |
| APPLICATION NO. | : 08/042450 | |
| DATED | : January 31, 1995 | |
| INVENTOR(S) | : Robert S. Acks | |

It is certified that error appears in the above-identified patent and that said Letters Patent is hereby corrected as shown below:

IN THE TITLE PAGE:

Item [*], change the patent term to read as follows: --[*] Notice: The portion of the term of this patent subsequent to September 10, 2010 has been disclaimed.--

Signed and Sealed this

Third Day of March, 2009

JOHN DOLL
*Acting Director of the United States Patent and Trademark Office*